(12) United States Patent
Murayama

(10) Patent No.: US 11,058,260 B2
(45) Date of Patent: Jul. 13, 2021

(54) LAVATORY UNIT FOR VEHICLE

(71) Applicant: The Yokohama Rubber Co., LTD., Tokyo (JP)

(72) Inventor: Hiroshi Murayama, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/642,875

(22) PCT Filed: Aug. 27, 2018

(86) PCT No.: PCT/JP2018/031509
§ 371 (c)(1),
(2) Date: Feb. 27, 2020

(87) PCT Pub. No.: WO2019/044742
PCT Pub. Date: Mar. 7, 2019

(65) Prior Publication Data
US 2020/0196804 A1    Jun. 25, 2020

(30) Foreign Application Priority Data
Aug. 28, 2017  (JP) .............................. JP2017-163342

(51) Int. Cl.
*A47K 4/00* (2006.01)
*B60R 15/02* (2006.01)
(Continued)

(52) U.S. Cl.
CPC ............... *A47K 4/00* (2013.01); *B60R 15/02* (2013.01); *B60R 15/04* (2013.01); *E03C 1/05* (2013.01);
(Continued)

(58) Field of Classification Search
CPC . A47K 3/022; A47K 3/03; A47K 4/00; A47K 13/24; A47K 17/00; A47K 17/02;
(Continued)

(56) References Cited

U.S. PATENT DOCUMENTS 2,355,615 A * 8/1944 Helmuth .................. A47K 4/00
4/553
6,076,199 A * 6/2000 Na .......................... E03D 1/003
4/420.4
(Continued)

FOREIGN PATENT DOCUMENTS

CN          106759754         5/2017
DE     20 2005 010 648       9/2005
(Continued)

OTHER PUBLICATIONS

International Search Report for International Application No. PCT/JP2018/031509 dated Sep. 25, 2018, 6 pages, Japan.
(Continued)

*Primary Examiner* — J C Jacyna
(74) *Attorney, Agent, or Firm* — Thorpe North & Western

(57) ABSTRACT

A lavatory unit for a vehicle is provided for washing feet. A toilet seat is put in the use position, a lid is put in the open position, the lid and a water drainage plate coupled by an engage/disengage mechanism are disengaged, and the water drainage plate is rotated to the placed position. With pressure on the water drainage plate, water is discharged from a faucet for a predetermined time by a water control unit, and the foot is washed on the water drainage plate. The water is drained to the inside of a toilet body through a discharge port. Once the foot is washed, the water on the upper surface of the water drainage plate is wiped, the water drainage plate
(Continued)

is rotated from the placed position to the open position of the lid, or the lid is rotated to the closed position.

18 Claims, 20 Drawing Sheets

(51) Int. Cl.
| | |
|---|---|
| *B60R 15/04* | (2006.01) |
| *E03C 1/05* | (2006.01) |
| *B60P 3/36* | (2006.01) |
| *B61D 35/00* | (2006.01) |
| *B63B 29/14* | (2006.01) |
| *B64D 11/02* | (2006.01) |

(52) U.S. Cl.
CPC .............. *B60P 3/36* (2013.01); *B61D 35/005* (2013.01); *B63B 29/14* (2013.01); *B64D 11/02* (2013.01)

(58) Field of Classification Search
CPC . B60R 15/02; B60R 15/04; B60P 3/36; B61D 35/005; B63B 29/14; B64D 11/02; E03C 1/05; E03D 11/00; E04H 1/12
See application file for complete search history.

(56) References Cited

U.S. PATENT DOCUMENTS

| | | |
|---|---|---|
| 10,753,074 B2 * | 8/2020 | Voetter .................. A47K 3/022 |
| 2016/0018129 A1 | 1/2016 | Koyama |
| 2017/0050473 A1 | 2/2017 | Muhlhoff et al. |
| 2017/0150855 A1 | 6/2017 | Seibt et al. |
| 2018/0112382 A1 | 4/2018 | Voetter |
| 2019/0118948 A1 * | 4/2019 | Fullerton ............... A47K 17/02 |

FOREIGN PATENT DOCUMENTS

| | | |
|---|---|---|
| FR | 2 263 342 | 10/1975 |
| JP | H01-070904 | 5/1989 |
| JP | H06-028609 | 8/1994 |
| JP | H08-151673 | 6/1996 |
| JP | 2017-124819 | 7/2017 |
| WO | WO 2014/141693 | 9/2014 |
| WO | WO 2015/165863 | 11/2015 |

OTHER PUBLICATIONS

European Search Report for European Application No. 18852271.8 dated Apr. 6, 2021, 5 pages, Germany.

* cited by examiner

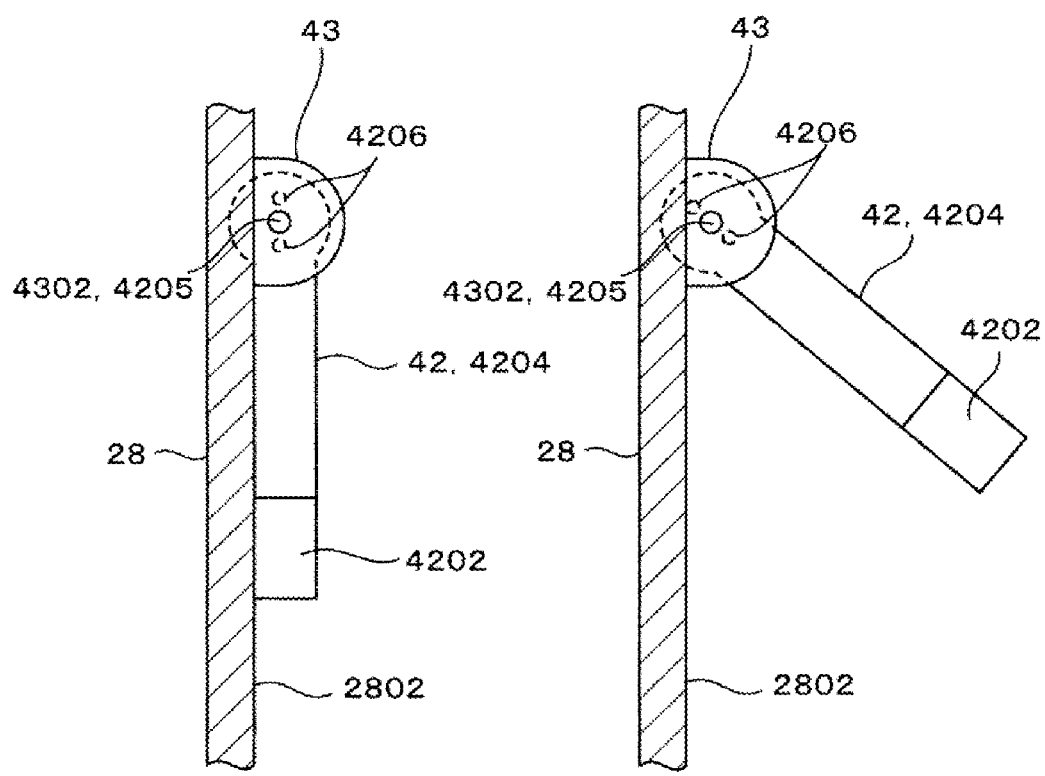

LAVATORY UNIT FOR VEHICLE

TECHNICAL FIELD

The present technology relates to lavatory unit for a vehicle.

BACKGROUND ART

A lavatory unit for a vehicle, such as an aircraft, a watercraft, a road vehicle, and a railway vehicle include a toilet and a wash basin in the lavatory unit (see International Patent Publication No. WO 2014/141693).

There is an Islamic ritual that involves a purifying procedure of washing parts of the body, such as the hands, mouth, nose, face, arms, hair, ears, and feet before prayer (wudu).

Such a procedure of washing the hands, mouth, nose, face, arms, hair, and ears can be performed using the wash basin in a lavatory unit of a vehicle. However, because the wash basin is typically positioned at waist-height, it is difficult to wash the feet.

An unorthodox body position must be taken to wash feet in the wash basin, making it a difficult task. Also, water may be splashed around the wash basin, wetting the floor. This results in inconvenient clean-up work.

Installing a wash basin exclusively for wudu in a lavatory unit is an option. However, installing a wash basin exclusively for wudu in a lavatory unit means that the lavatory unit needs to be greatly expanded.

SUMMARY

The present technology provides a lavatory unit for a vehicle in which sections of the body including feet can be easily washed without requiring clean-up work and without expanding the lavatory unit.

A lavatory unit for a vehicle according to an embodiment of the present technology including a toilet body, a toilet seat provided rotatably between a use position and a non-use position, at the use position the toilet seat being placed on the toilet body and at the non-use position the toilet seat positioned standing from a back end of the toilet body, and a lid provided rotatably between a cover position and an open position, at the cover position the lid being placed on the toilet seat positioned in the use position and covering the toilet seat, and at the open position the lid positioned standing from the back end of the toilet body and opening the toilet seat, the lavatory unit for a vehicle including, a water drainage plate rotatable together with the lid between the cover position and the open position in a state where the water drainage plate being stored within an inner surface of the lid, and separated from the lid in the open position of the lid, being put in a placed position where the water drainage plate being placed on the toilet seat in the use position, a faucet provided movably within the lavatory, a water control unit configured to start and stop discharge of water from the faucet, and a faucet holding portion that holds the faucet and causes water discharged from the faucet to head to inside the toilet body with the lid in the open position. The water drainage plate includes a placement portion that is placed on the toilet seat positioned in the use position and covers the toilet seat, and a drainage portion that allows a foot being placed on the drainage portion and guides water discharged from the faucet to inside the toilet body.

According to the present embodiment, to wash feet for example, the toilet seat is covered with the placement portion so that the feet to be washed can be placed at knee-height on the drainage portion of the water drainage plate. This allows feet to be easily washed without wetting the toilet seat and the toilet body as well as the floor of the lavatory unit.

Note that the hands, mouth, nose, face, arms, hair, and ears may be washed with the wash basin. However, the hands, mouth, nose, face, arms, hair, and ears can be easily washed in a similar manner above the water drainage plate without wetting the toilet seat and the toilet body as well as the floor of the lavatory unit.

In this way, the feet, hands, mouth, nose, face, arms, hair, and ears can be washed in the lavatory unit without wetting the floor. Thus, other toilet users can use the lavatory without being inconvenienced.

With the lavatory unit, sections of the body including the feet can be easily washed, removing the need to provide a wash basin exclusively for wudu, the need for clean-up work, and/or upsizing the lavatory unit.

BRIEF DESCRIPTION OF DRAWINGS

FIG. 13A is a cross-sectional side view illustrating a state of a faucet fixing device placed in a storage position. FIG. 13B is a cross-sectional side view of the lid illustrating a state of the faucet fixing device placed in a use position.

DETAILED DESCRIPTION

First Embodiment

In the following embodiment of the present technology described with reference to the drawings, the lavatory unit for a vehicle is an aircraft lavatory unit.

Figure 1:
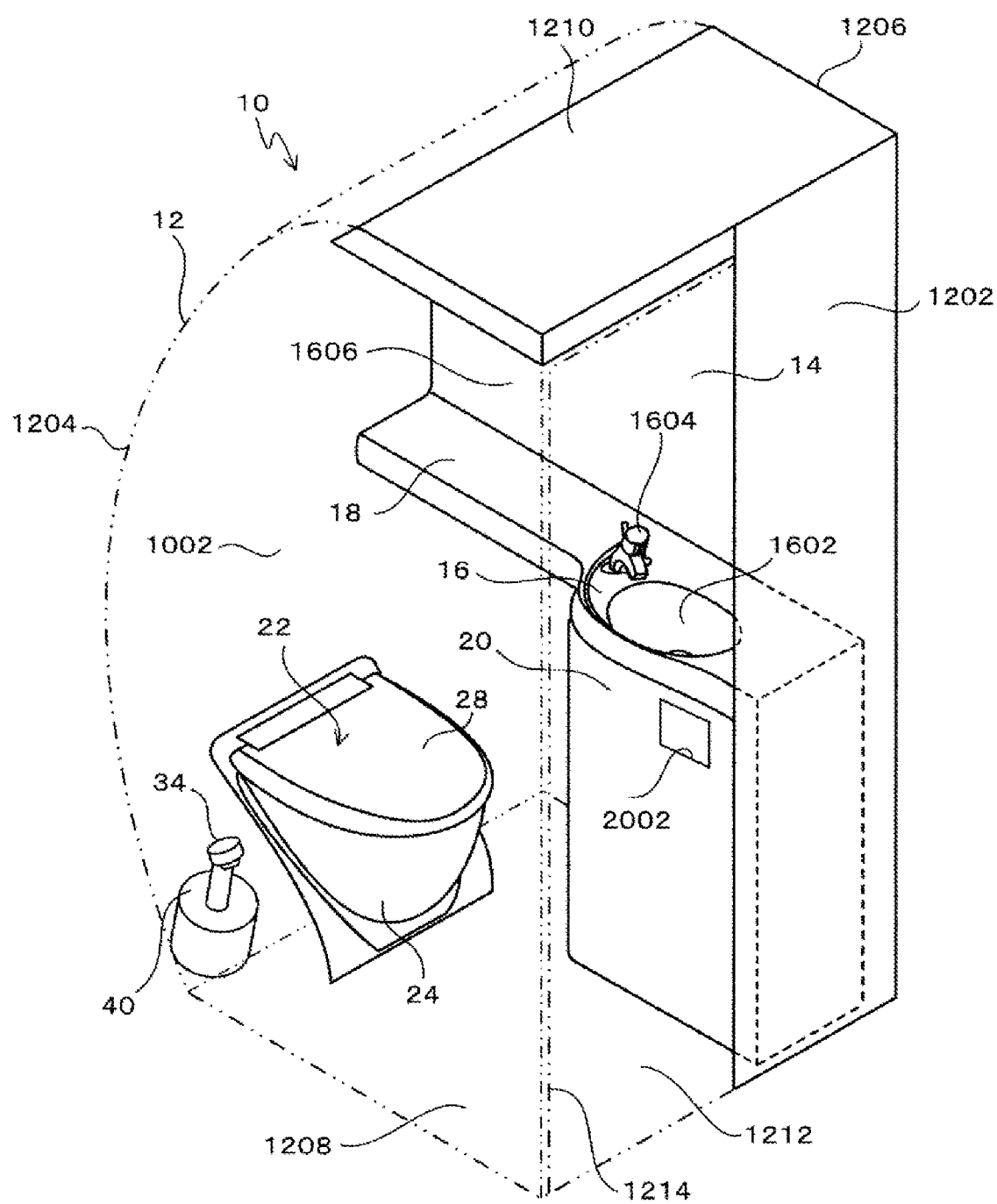
FIG. 1 is a perspective view of a lavatory unit according to a first embodiment.

As illustrated in FIG. 1, a lavatory unit 10 includes a structural frame 12 installed on the floor of an aircraft. A lavatory 1002 is formed inside the structural frame 12.

The structural frame 12 includes a front wall 1202, a rear wall 1204 facing the front wall 1202, left and right side walls 1206 and 1208, a ceiling (ceiling wall) 1210, and a floor (bottom wall) 1212.

The front wall 1202 is provided with an entrance 1214 that opens and closes by a door 14.

In the present embodiment, the lavatory unit 10 is disposed to the side of a longitudinal aisle extending in the front-rear direction of the fuselage. As the front wall 1202 faces the longitudinal aisle, the rear wall 1204 is disposed close to the body of the fuselage. The rear wall 1204 is formed with a curved surface that changes in position in relation to the front wall 1202 as it extends to the upper portion, conforming to the body shape of the fuselage.

In the lavatory 1002, a sink 16 and a counter 18 are disposed against one side wall 1206.

The sink 16 is provided on the top surface of a base 20 installed on the bottom wall 1212 of the lavatory 1002 inward from the side wall 1206.

The sink 16 includes a wash basin 1602, a wash faucet 1604, and a mirror 1606.

A trash can device (not illustrated) is provided inside the base 20, and reference sign 2002 denotes a trash insert opening.

A toilet 22 is provided against the rear wall 1204 on the front side of the rear wall 1204 (the direction the rear wall 1204 faces the front wall 1202).

Figure 2:
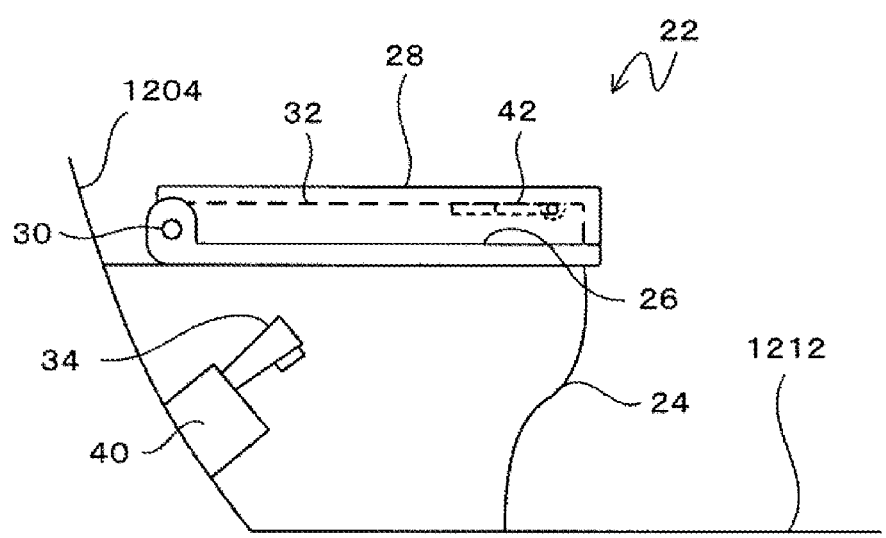
FIG. 2 is a side view of a toilet illustrating a state of a lid placed in a cover position according to the first embodiment.

As illustrated in FIGS. 1 and 2, the toilet 22 includes a toilet body 24, a toilet seat 26, and a lid 28.

The toilet body 24 is installed on the floor 1212 (bottom wall).

Figure 3:
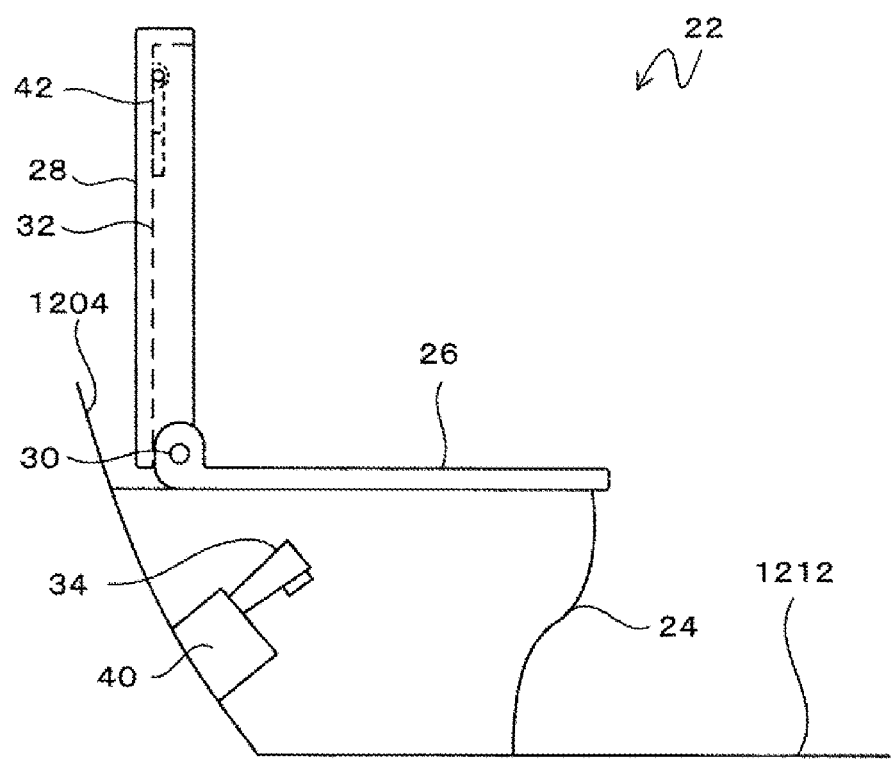
FIG. 3 is a side view of the toilet illustrating a state of the lid placed in an open position and a toilet seat placed in a use position according to the first embodiment.
Figure 4:
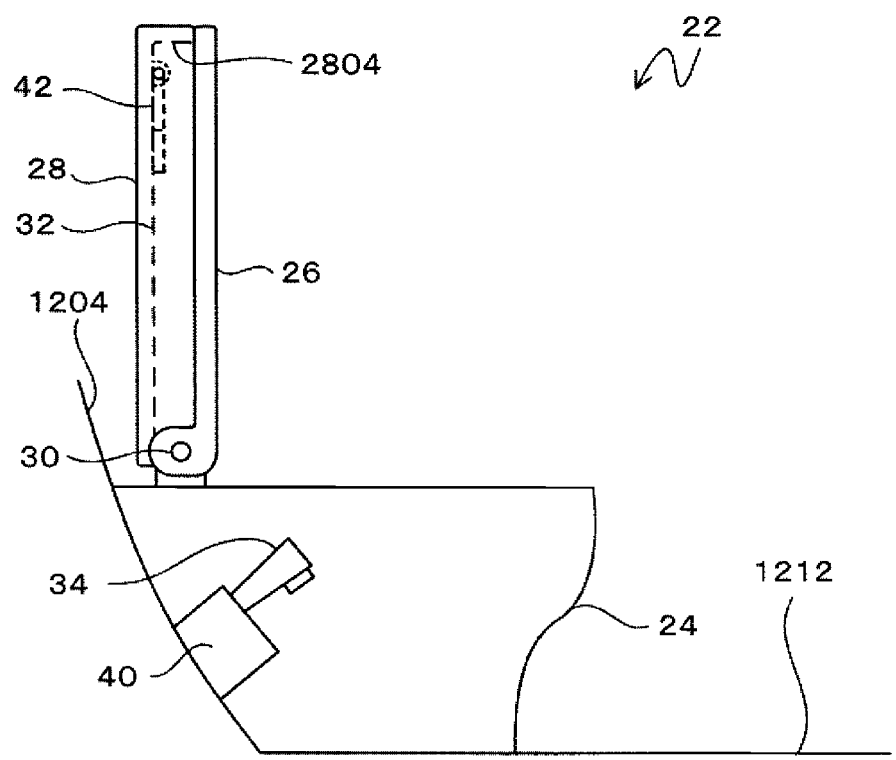
FIG. 4 is a side view of a toilet illustrating a state of the toilet seat placed in a non-use position according to the first embodiment.

As illustrated in FIGS. 3 and 4, the toilet seat 26 is disposed on the toilet body 24 and is rotatable between a use position and a non-use position. At the use position, the toilet seat 26 is placed on the upper portion of the toilet body 24 (FIG. 3), and at the non-use position, the toilet seat 26 is standing from the back end of the toilet body 24 (end portion on the rear wall 1204 side) (FIG. 4).

Note that when a person sits on the toilet seat 26 in the use position, the person faces the front wall 1202. The direction to the front of the toilet bowl 22 corresponds to the front wall 1202 direction and the direction to the rear of the toilet bowl 22 corresponds to the rear wall 1204 direction.

As illustrated in FIGS. 2 and 3, the lid 28 is rotatable between a cover position and an open position. At the cover position, the lid 28 covers the toilet seat 26 in the use position (FIG. 2), and at the open position, the lid 28 is standing from the back end of the toilet body 24, opening the toilet seat 26 (FIG. 3).

Figure 10:
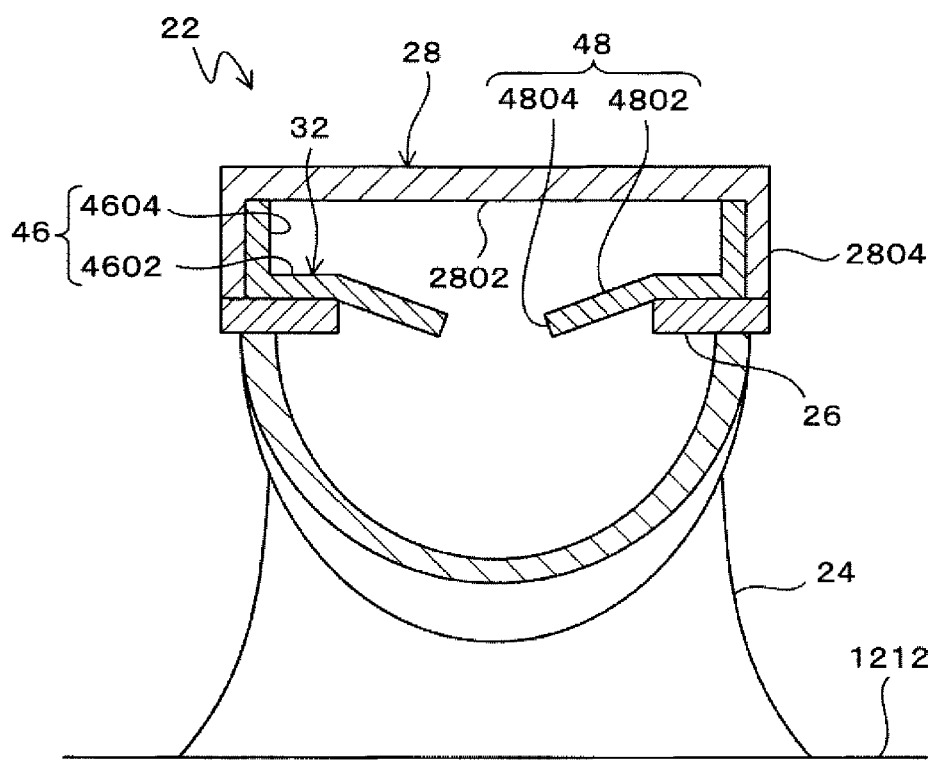
FIG. 10 is a cross-sectional front view of the toilet illustrating a state of the lid placed in a cover position according to the first embodiment.

As illustrated in FIG. 10, the lid 28 includes an inner surface 2802 that faces the toilet body 24 in the cover position and a side wall 2804 that stands from the periphery of the inner surface 2802 except at the back edge.

In the present embodiment, the center of rotation of the toilet seat 26 and the lid 28 is a support shaft 30 in common.

Figure 17:
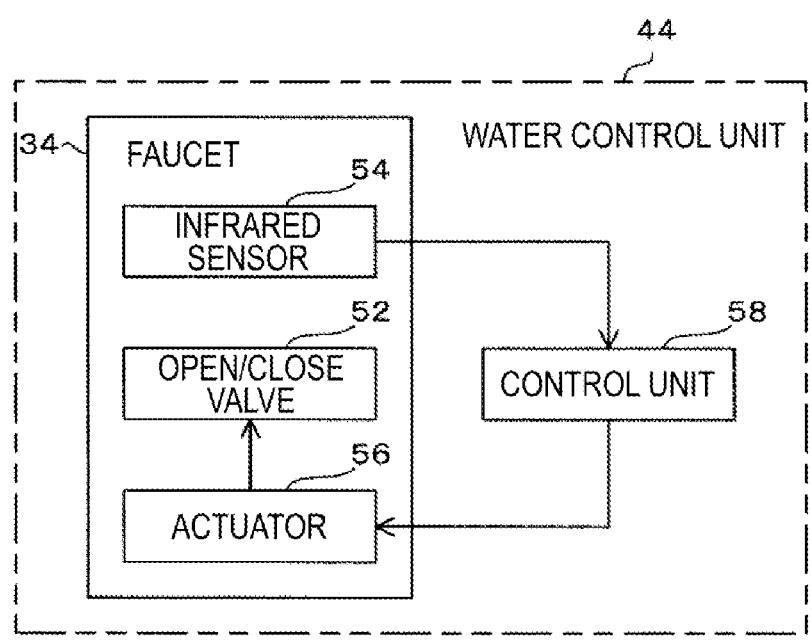
FIG. 17 is a block diagram illustrating the configuration of a water control unit.

Also, as illustrated in FIGS. 2 to 7, to enable sections of the body including the feet to the easily washed in the lavatory 1002 without dirtying the lavatory 1002, the lavatory 1002 includes a water drainage plate 32, a faucet 34, a faucet holding portion 36, an engage/disengage mechanism 38 (FIG. 9), a faucet storage device 40, a faucet fixing device 42, and a water control unit 44 (FIG. 17).

Figure 5:
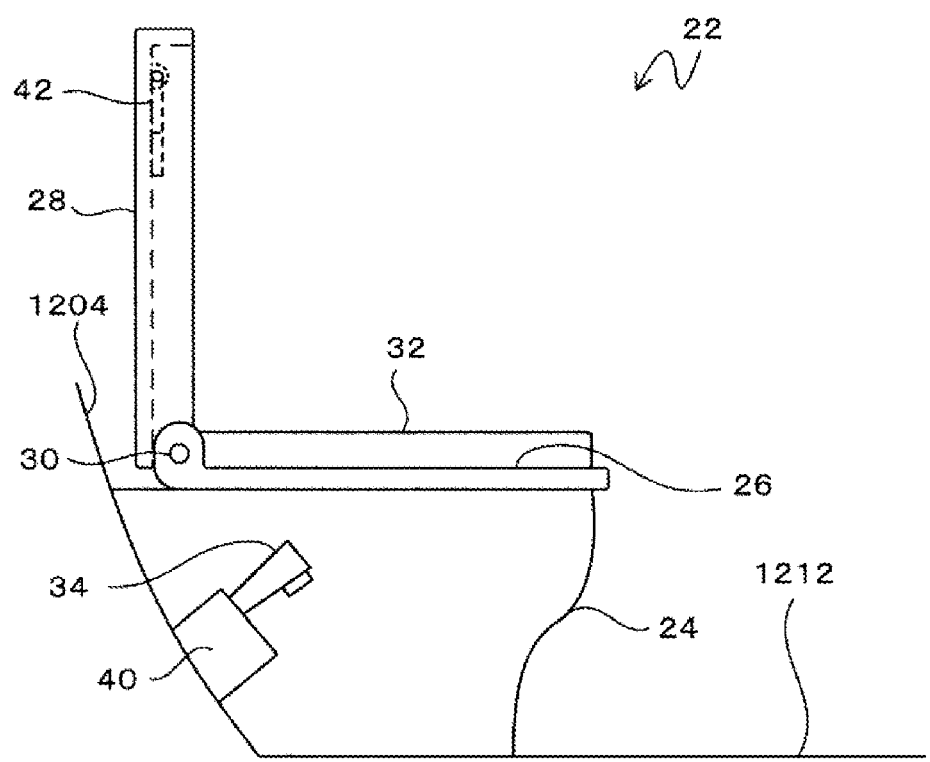
FIG. 5 is a side view of the toilet illustrating a state of a water drainage plate placed in a placed position and a faucet fixing device placed in a storage position according to the first embodiment.
Figure 6:
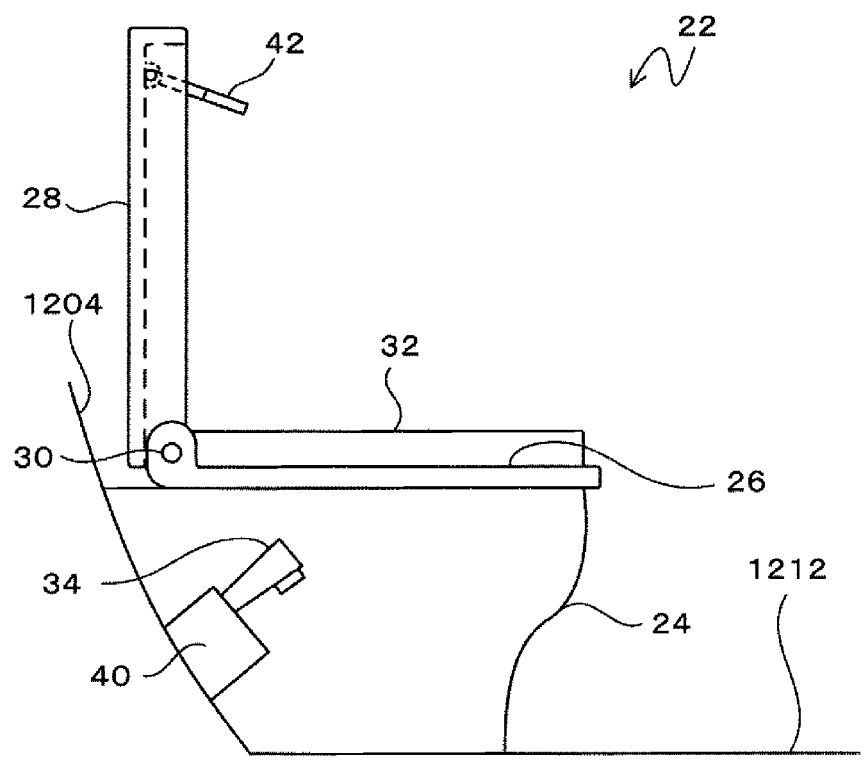
FIG. 6 is a side view of the toilet illustrating a state of the water drainage plate placed in a placed position and the faucet fixing device placed in a use position according to the first embodiment.
Figure 7:
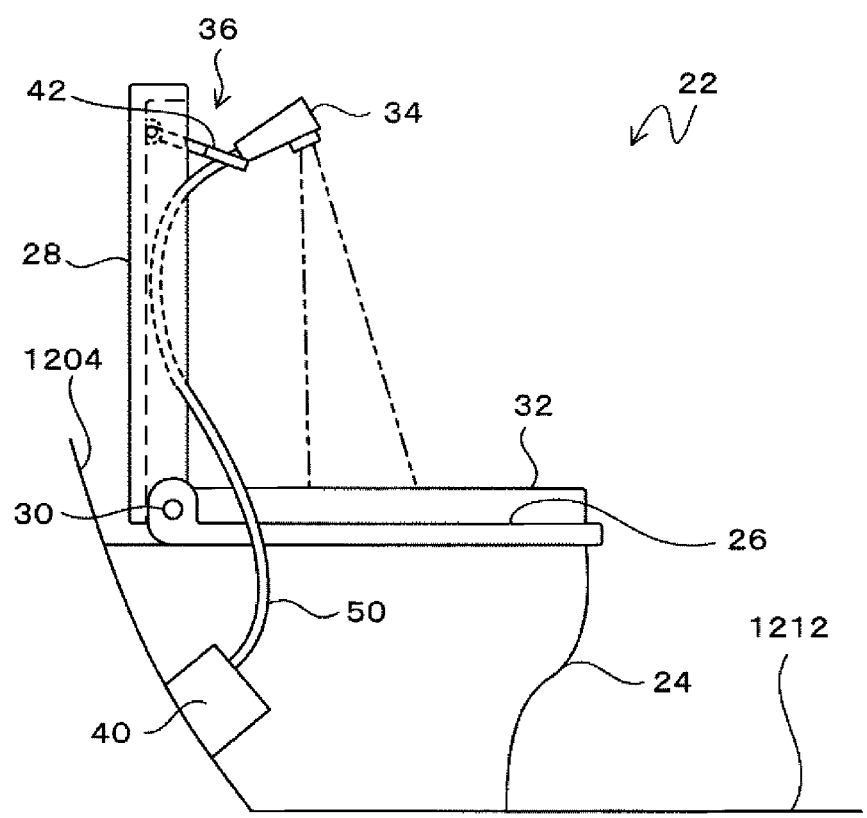
FIG. 7 is a side view of the toilet illustrating a state of the water drainage plate placed in a placed position and the faucet discharging water according to the first embodiment.

The water drainage plate 32 is made of a synthetic resin. As illustrated in FIGS. 2, 3, and 10, the water drainage plate 32, in a state of stored within the inner surface 2802 of the lid 28 at inner side of the side wall 2804, is rotatable between a cover position and an open position with the lid 28 about the support shaft 30. Also, as illustrated in FIGS. 5 to 7, the water drainage plate 32 is placed in a placed position on the toilet seat 26 in a use position, after being separated from the lid 28 in an open position.

Figure 9:
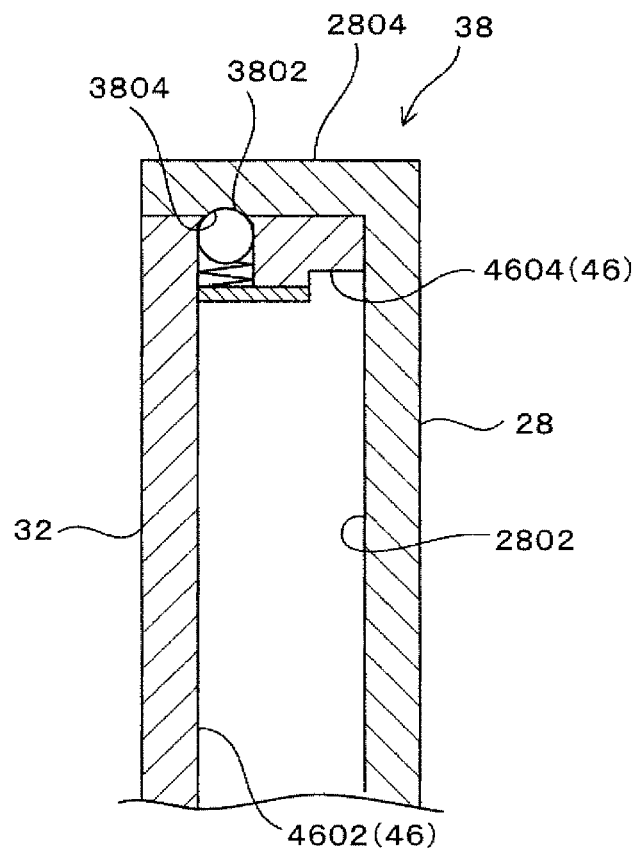
FIG. 9 is a cross-sectional view illustrating a configuration of an engage/disengage mechanism.

As illustrated in FIG. 9, the engage/disengage mechanism 38 detachably couples the lid 28 and the water drainage plate 32, maintain a state where the water drainage plate 32 stored within the inner surface 2802 of the lid 28 in a state of the lid 28 and the water drainage plate 32 being coupled, and enables the water drainage plate 32 to be separated from the lid 28 and rotate in a state where coupling of the water drainage plate 32 and the lid 28 is released.

Figure 8:
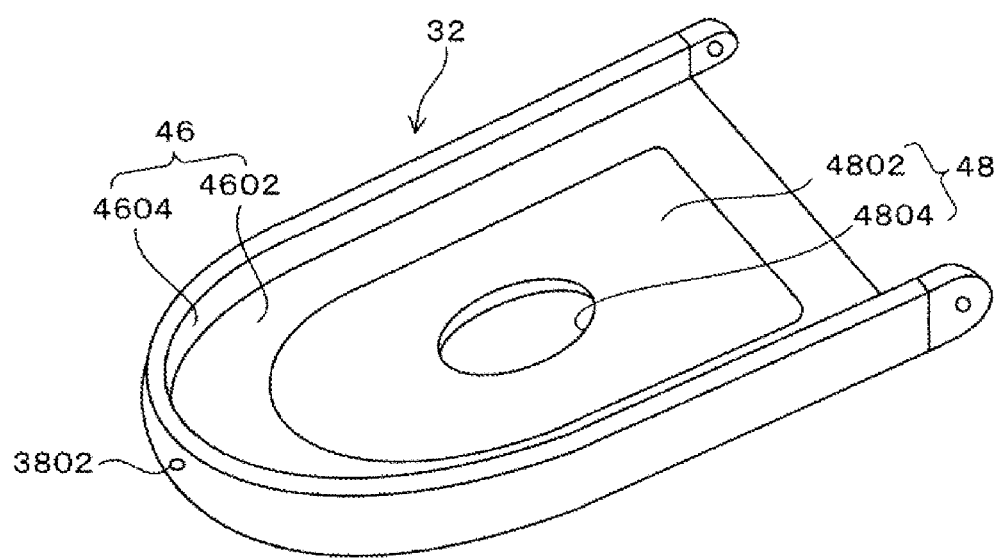
FIG. 8 is a perspective view of a drainage plate.

In the present embodiment, as illustrated in FIGS. 8 and 9, the engage/disengage mechanism 38 includes a rigid ball 3802 biased in the direction of normally projecting to the front portion of the water drainage plate 32 and a recess portion 3804 formed in the side wall 2804 of the lid 28 to which the rigid ball 3802 can detachably couple.

When the rigid ball 3802 is engaged with the recess portion 3804 of the side wall 2804 of the lid 28, the water drainage plate 32 is in a state of being stored within the inner surface 2802 of the lid 28. When the water drainage plate 32 is in this stored state, the water drainage plate 32 rotates with the lid 28.

When the water drainage plate 32 is pulled out from the lid 28, the rigid ball 3802 separates from the recess portion 3804, thus the water drainage plate 32 is separated from the lid 28 and can rotate independently of the lid 28. As illustrated in FIGS. 3 and 5, the water drainage plate 32 can rotate between a placed position and an open position. At the placed position, the water drainage plate 32 is placed on the toilet seat 26 in the use position (FIG. 5), and at the open position, the water drainage plate 32 is stored within the inner surface 2802 of the lid 28 in the open position (FIG. 3).

Note that when the water drainage plate 32 stands from the placed position, the rigid ball 3802 is pressed by the inner surface of the side wall 2804 of the lid 28 and recedes. When the recess portion 3804 is located above the rigid ball 3802, the rigid ball 3802 protrudes and engages with the recess portion 3804, putting the water drainage plate 32 in a state of being stored within the inner surface 2802 of the lid 28.

The configuration of the engage/disengage mechanism 38 is not limited to the structure of this embodiment, and various known structures can be employed.

Figure 11:
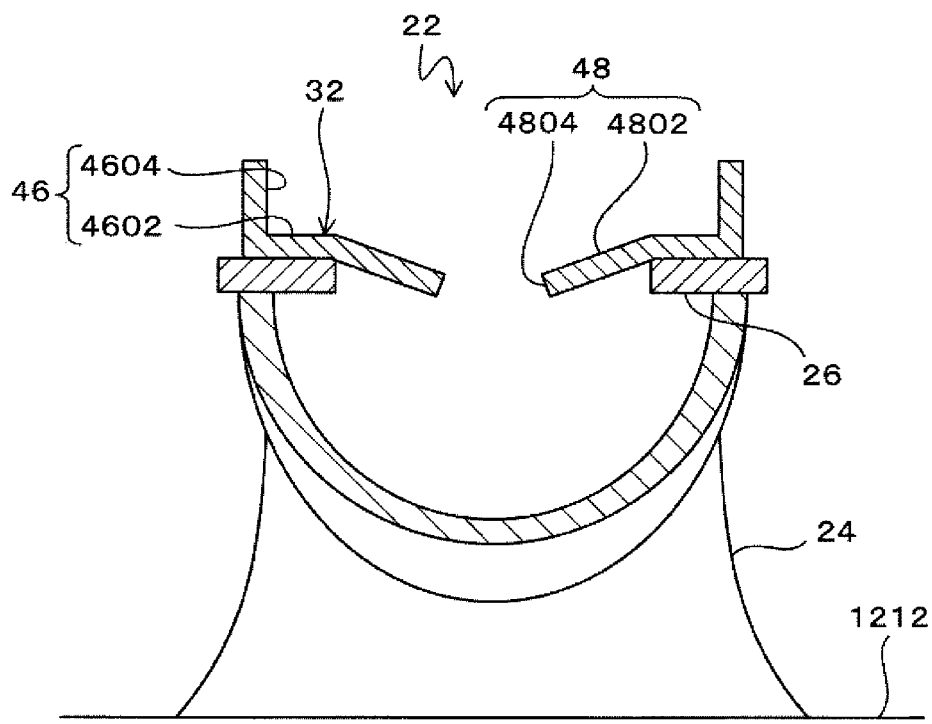
FIG. 11 is a cross-sectional front view of the toilet illustrating a state of the water drainage plate placed in a placed position according to the first embodiment.

As illustrated in FIGS. 8, 10, and 11, the water drainage plate 32 includes a placement portion 46 that is placed above and covers the toilet seat 26 placed in a use position, and a drainage portion 48 that, in a state of the placement portion 46 being placed on the toilet seat 26, allows feet to be placed upon the drainage portion 48 and guides water discharged from the faucet 34 to inside the toilet body 24.

The placement portion 46 and the drainage portion 48 are integrally formed with the peripheral portion of the drainage portion 48 being supported by the placement portion 46.

The placement portion 46 includes a placement portion body 4602 that is placed on the toilet seat 26 and covers the toilet seat 26, and a raised wall 4604 that stands up completely around a periphery of the placement portion body 4602.

The drainage portion 48 includes an inclined surface 4802 that, in a state of the placement portion 46 being placed on the toilet seat 26, gets lower going inward from the placement portion 46, and a drain hole 4804 formed in the inclined surface 4802 at the position corresponding to the center of the placement portion 46.

Figure 14:
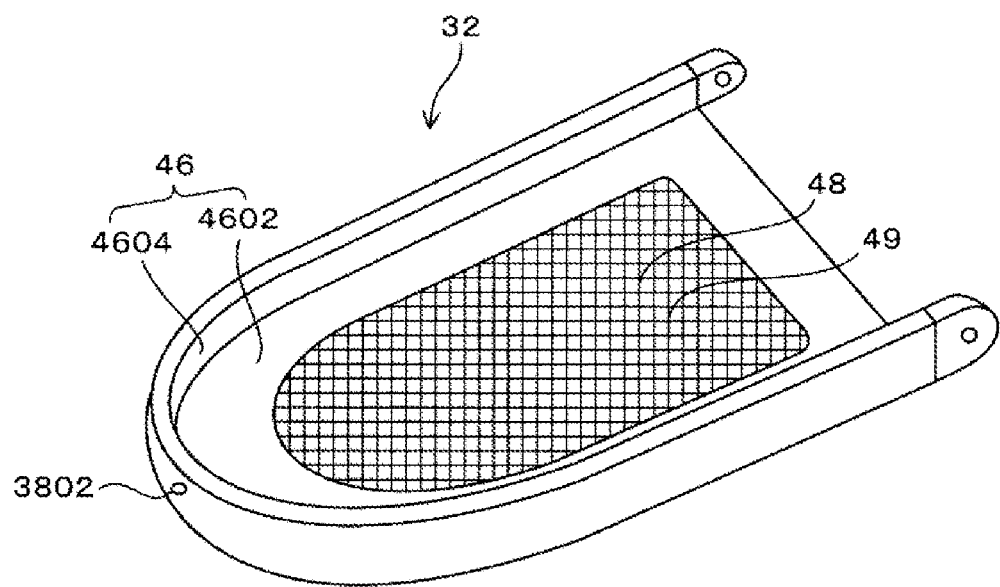
FIG. 14 is a perspective view illustrating a water drainage plate according to a modified example.
Figure 15:
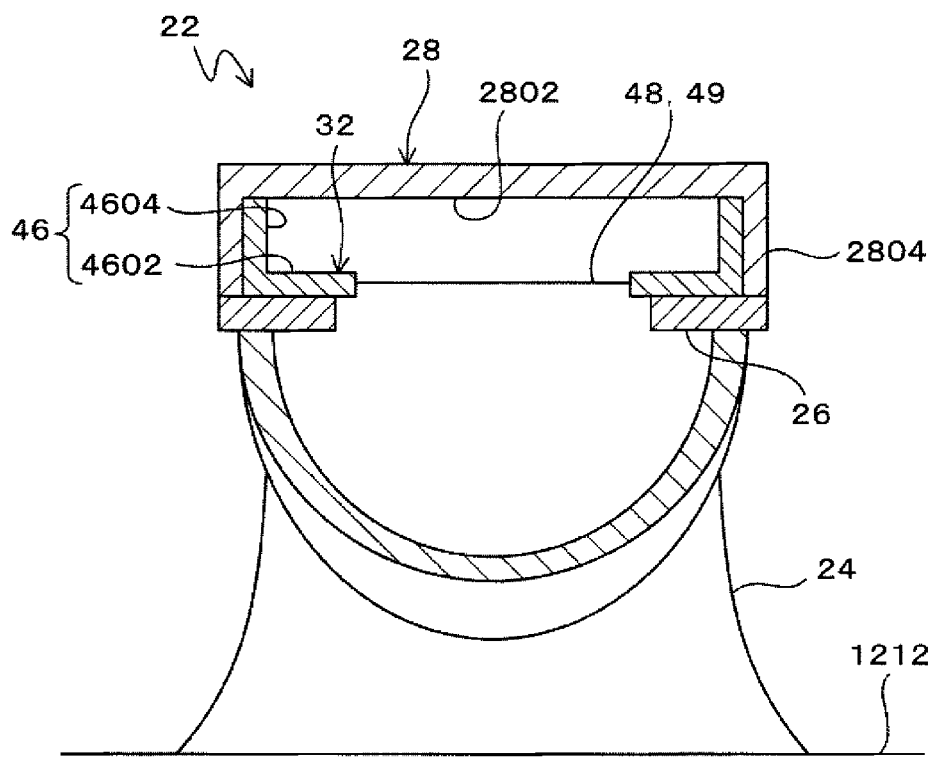
FIG. 15 is a cross-sectional front view of the toilet illustrating a state of a lid placed in a cover position according to the modified example of the water drainage plate.
Figure 16:
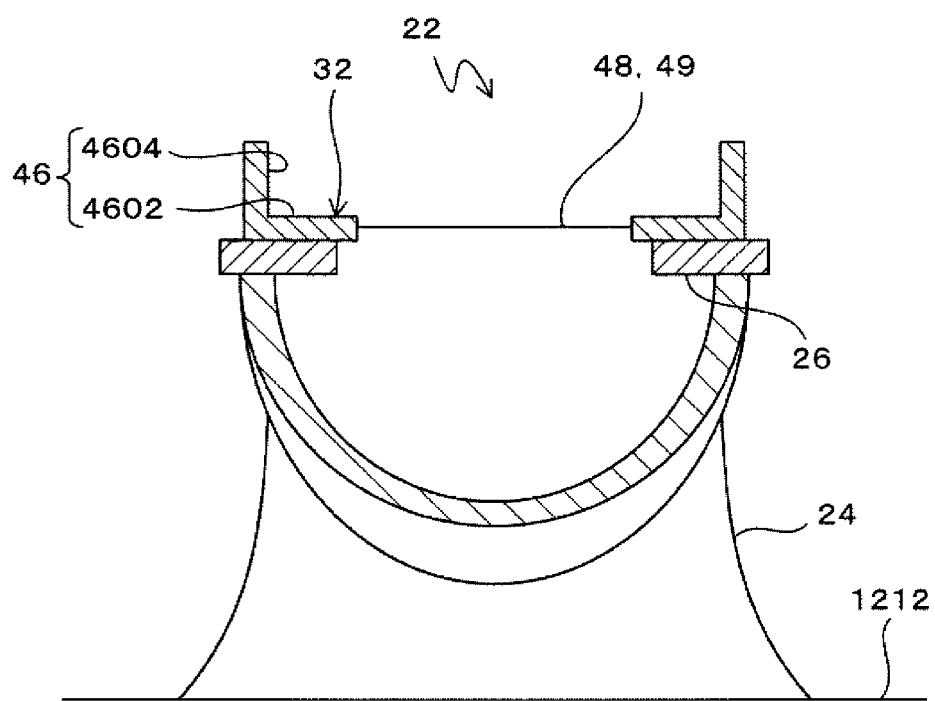
FIG. 16 is a cross-sectional front view of the toilet illustrating a state of the water drainage plate placed in a placed position according to the modified example of the water drainage plate.

Note that, as illustrated in FIGS. 14 to 16, the drainage portion 48 may include a net-like member 49 disposed inward of the placement portion 46 on which a foot can be placed in a state where the placement portion 46 is placed on the toilet seat 26, and the net-like member 46 guides water discharged from the faucet 34 to the inside of the toilet body 24. However, the configuration of the water drainage plate 32 is not limited to the configuration of this embodiment. Various other configurations can be employed, however the configurations illustrated in FIGS. 8 and 14 are advantageous in that a simple configuration of the water drainage plate 32 can be achieved.

The faucet 34 is provided movably within the lavatory 1002.

In the present embodiment, as illustrated in FIG. 7, the faucet 34 is disposed on an end portion of a flexible hose 50 that supplies water and internally includes an open/close valve 52 (FIG. 17).

As illustrated in FIGS. 1 and 7, the faucet storage device 40 is provided in a lower portion of the rear wall 1204 on a side of the toilet 22, stores the hose 50 in a manner allowing it to pulled out, and detachably holds the faucet 34 in a state of the hose 50 being stored.

Note that the wash faucet 1604 may be used as the faucet 34. In this case, the hose 50 may be connected to the wash faucet 1604 and the wash faucet 1604 may be pulled out from the sink 16 to wash sections of the body including the feet with the wash faucet 1604.

As illustrated in FIG. 7, the faucet holding portion 36 detachably holds the faucet 34 so that the water discharged from the faucet 34 is directed inside the toilet body 24 when the lid 28 in is in the open position.

In the present embodiment, the faucet holding portion 36 includes the lid 28, and the faucet fixing device 42 that is provided on the inner surface 2802 of the lid 28 and detachably holds the faucet 34.

The faucet fixing device 42 is provided on the inner surface 2802 of the lid 28 at an end portion of the lid 28 that is a section opposite from the support shaft 30.

As illustrated in FIGS. 5, 6, 7, 13A and 13B, the faucet fixing device 42 is provided rotatably between a storage position and a use position. At the storage position, the faucet fixing device 42 overlap with the inner surface 2802 of the lid 28 (FIGS. 5 and 13A), and at the use position, the faucet fixing device 42 stands from the inner surface 2802 of the lid 28 (FIGS. 6, 7, and 13B).

Figures 12A, 12B:
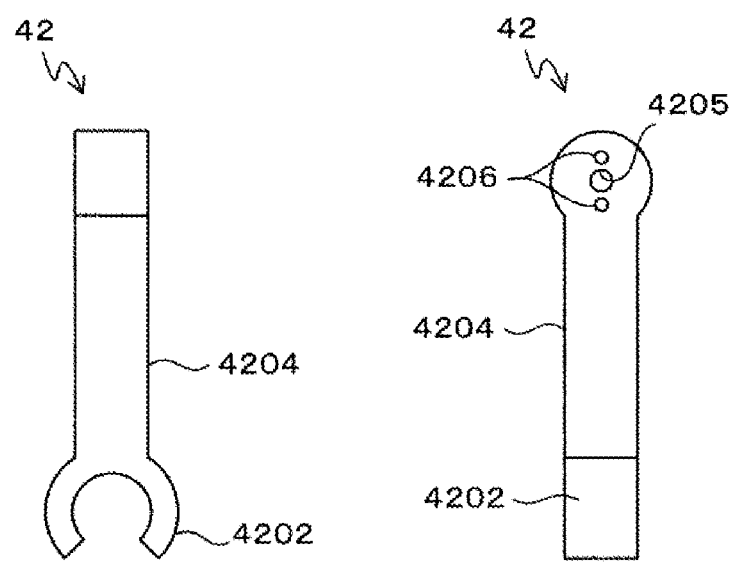
FIG. 12A is a plan view of a faucet fixing device.
FIG. 12B is a side view of the faucet fixing device.

Specifically, as illustrated in FIGS. 12A and 12B, the faucet fixing device 42 includes a fixing device body 4204 with a bifurcated fixing portion 4202. As illustrated in FIGS. 13A and 13B, a bearing hole 4205 of a base portion of the fixing device body 4204 is rotatably coupled to a support shaft 4302 of a hinge 43 at the inner surface 2802 of the lid 28, and a rigid ball (not illustrated), which is built in the hinge 43 and biased in a protruding direction by a spring (not illustrated), engages with a recess portion 4206 of the base portion (FIG. 12B). In this manner, the faucet fixing device 42 is positioned in a stored position and a use position, and thus the faucet fixing device 42 is rotatably provided between a stored position and a use position.

As illustrated in FIG. 7, faucet fixing device 42 detachably holds the faucet 34 in the use position so that the water from the faucet 34 is discharged directed inside the toilet body 24.

Note that the faucet fixing device 42 is located inward from the placement portion 46 of the water drainage plate 32 at a section facing the drainage portion 48 in a state of the water drainage plate 32 being stored within the inner surface 2802 of the lid 28.

The water control unit 44 is configured to start and stop the discharge of water from the faucet 34.

As illustrated in FIG. 17, the water control unit 44 may include an infrared sensor 54 that is provided on the faucet 34 and detects whether a foot is on the water drainage plate 32, an actuator 56 that opens and closes the open/close valve 52 being built-in in the faucet 34, and a control unit 58 configured to control the actuator 56 on the basis of a detection signal from the infrared sensor 54 and open the open/close valve 52 during a predetermined time.

Also, the water control unit 44 may include a switch provided on the wall surface of the lavatory 1002, and the control unit 58 configured to control the actuator 56 on the basis of an operation signal from the switch and open the open/close valve 52 during a predetermined time.

Also, the water control unit 44 may include a push switch provided on the faucet 34, and the control unit 58 configured to control the actuator 56 on the basis of an operation signal from the push switch and open the open/close valve 52 during a predetermined time. Any such known configurations may be employed.

Note that in an example in which the wash faucet 1604 is used as a faucet for washing sections of the body including the feet, a configuration in which the water control unit 44 includes a knob provided on the wash faucet 1604 that is operated to start and stop the discharge of water is employed.

Next, an example of how feet can be washed in the lavatory unit 10 for a vehicle will be described.

As illustrated in FIGS. 5 and 11, the toilet seat 26 is put in the use position, the lid 28 is put in the open position, disengage the lid 28 and the water drainage plate 32 in a coupled state by the engage/disengage mechanism 38, the lid 28 is put to stay in the open position, and the water drainage plate 32 is rotated to the placed position.

Next, the faucet fixing device 42 is rotated from the stored position illustrated in FIGS. 5 and 13A to the use position illustrated in FIGS. 6 and 13B.

Then, as illustrated in FIG. 7, the faucet 34 is held by the faucet fixing device 42.

Here, after the foot is placed on the water drainage plate 32, water is discharged from the faucet 34 during a predetermined time by the water control unit 44 and the foot is washed on the water drainage plate 32. The water is drains to the inside of the toilet body 24 through the drain hole 4804.

Once the foot is washed, the water on the upper surface of the placement portion body 4602 and the water drainage plate 32 is wiped. And as illustrated in FIG. 3, the water drainage plate 32 is rotated from the placed position to the open position of the lid 28, or as illustrated in FIG. 2, the lid 28 is rotated to the closed position.

The water drainage plate 32 and the lid 28 are joined by the engage/disengage mechanism 38 after rotation.

After use in this manner, when the next user who does not wash their feet uses the toilet, the water drainage plate 32 rotates together with the lid 28 when the lid 28 is opened or closed. Thus, the water drainage plate 32 is not left on the toilet seat 26 becoming an inconvenience, and the lavatory unit 10 can be used in the same manner as a typical lavatory unit.

According to the present embodiment, in washing feet, the toilet seat 26 is covered by the placement portion body 4602, the raised wall 4604 stands completely around the periphery of the placement portion body 4602, and the feet to be washed can be placed at knee-height on the drainage portion 48 of the water drainage plate 32. This allows feet to be easily washed without wetting the toilet seat 26 and the toilet body 24 as well as the floor 1212 of the lavatory unit 10.

Note that the hands, mouth, nose, face, arms, hair, and ears may be washed with the wash basin 1602. However, the hands, mouth, nose, face, arms, hair, and ears can be easily washed in a similar manner above the water drainage plate 32 without wetting the toilet seat 26 and the toilet body 24 as well as the floor 1212 of the lavatory unit 10.

In this way, the toilet 22 can be used to easily wash sections of the body including the feet and the sections of the body including the feet can be washed in the lavatory unit 10 without wetting the floor 1212. This removes the need for clean-up work and allows other toilet users to use the lavatory 1002 without being inconvenienced.

With the lavatory unit 10, sections of the body including the feet can be washed, removing the need to provide a wash basin exclusively for wudu and/or upsizing the lavatory unit.

Also, the water drainage plate 32 being stored within the inner surface 2802 of the lid 28 is advantageous in that operation in use of the water drainage plate 32 is made easy, and is advantageous in that, since the space of the lavatory unit 10 tend to be limited from the perspective of increasing seats, the water drainage plate 32 can be provided in a manner that doesn't require the space of the lavatory unit 10 to be reduced.

Also, the faucet fixing device 42 is provided within the inner surface 2802 of the lid 28 and the faucet 34 is held by using the lid 28 when using the faucet 34. This allows the faucet 34 to be used without taking up space. For example, a hanger may be provided that holds the faucet 34 at an end portion of the hanger, and the hanger is pivotable in the horizontal plane or rotatable in the vertical plane between a stored state overlapping the wall surface of the lavatory 1002 and a use position located above the toilet bowl 22. However, the embodiment described is advantageous because the lid 28 of the toilet 22 can be used to hold the faucet 34, allowing the faucet 34 to be held without providing another member to hold the faucet 34. This allows the faucet 34 to be held in the use position in a manner that doesn't require reducing space in the lavatory 1002.

Furthermore, the faucet 34 is provided being able to be pulled out from a lower portion of the rear wall 1204, allowing the faucet 34 to be located at a lower portion of the rear wall 1204 when not in use. This is advantageous in that the faucet 34 does not become an inconvenience and the next toilet user can use the lavatory 1002 without being inconvenienced.

Also, in the present embodiment, the engage/disengage mechanism 38 is provided. This allows toilet users that do not wash sections of their body including the feet to open and close the lid 28 in a similar manner to a typical toilet 22. The water drainage plate 32 not being present on the toilet seat 26 is advantageous in that the lavatory 1002 can be used without causing inconvenience.

Second Embodiment

Next, a second embodiment will be described with reference to the FIGS. 18 to 20.

The second embodiment makes feet washing particularly easy and includes, in addition to that of the first embodiment, a sitting plate 60.

Figure 18:
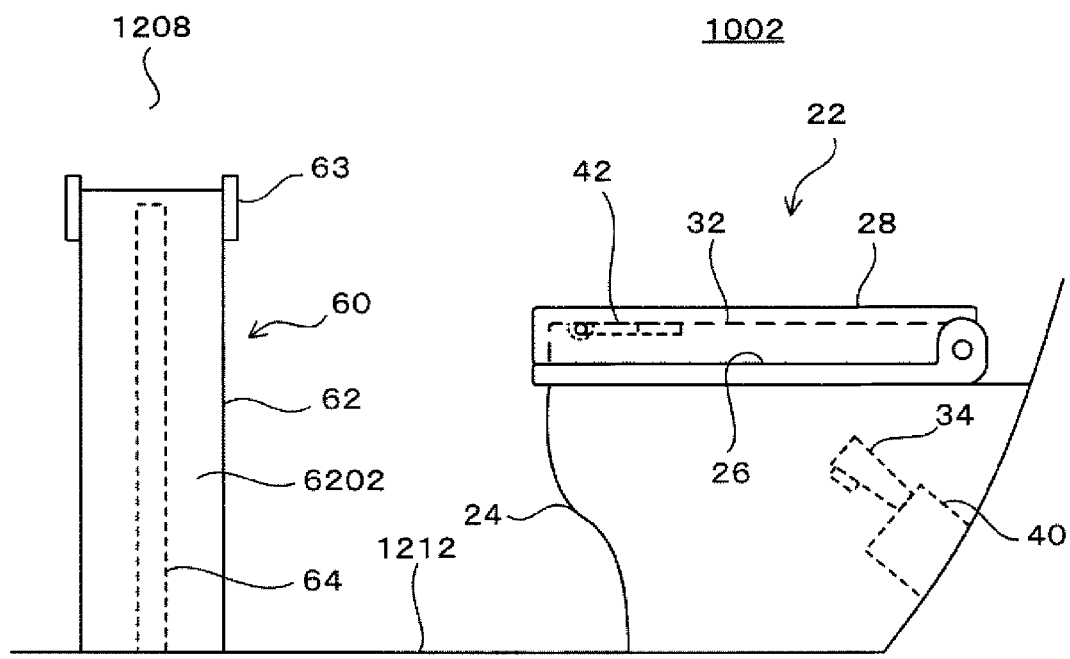
FIG. 18 is a side view of a lavatory illustrating a state of a sitting plate placed in a storage position according to a second embodiment.
Figure 19:
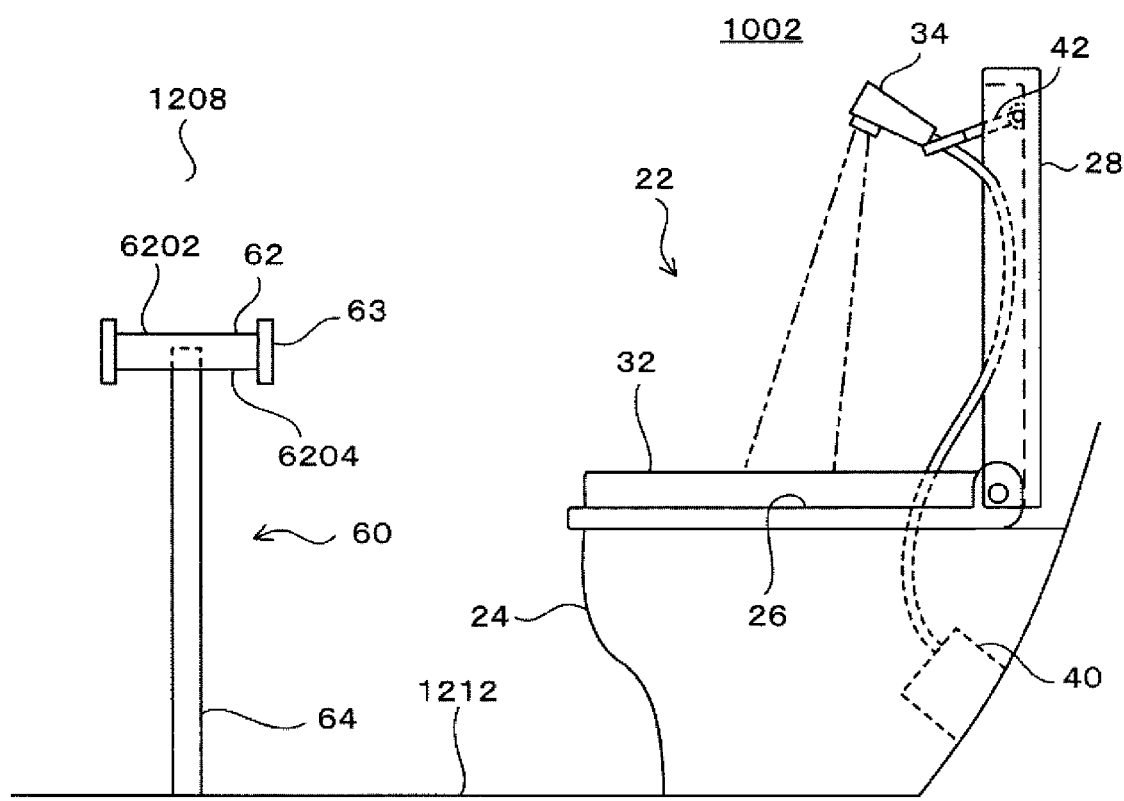
FIG. 19 is a side view of the lavatory illustrating a state of the sitting plate placed in a use position according to the second embodiment.
Figure 20:
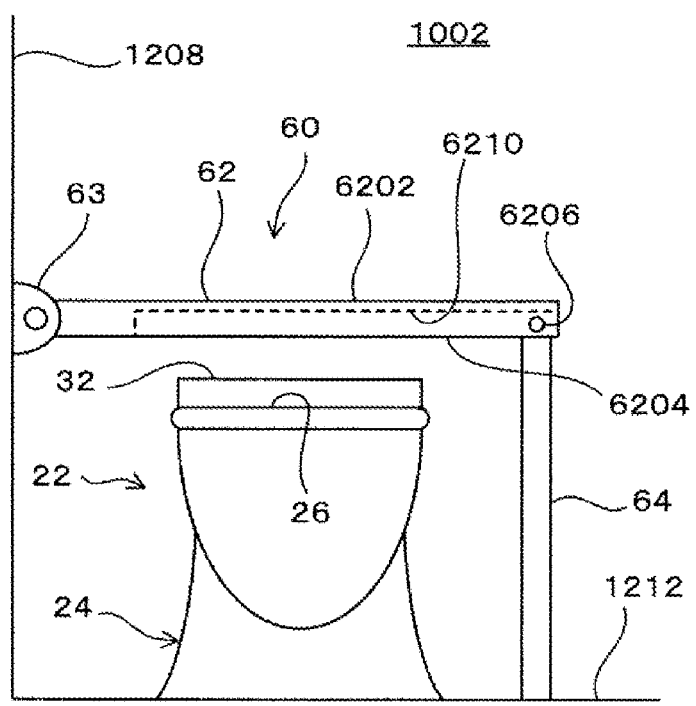
FIG. 20 is a front view of the lavatory illustrating a state of the sitting plate placed in a use position according to the second embodiment.

In other words, as illustrated in FIGS. 18 to 20, the sitting plate 60 is able to rotate between a use position and a storage position. At the use position, the sitting plate 60 extends in the horizontal direction toward the front of the toilet 22 and allows a user to sit facing the toilet 22 (FIGS. 19 and 20), and at the storage position, the sitting plate 60 overlaps the wall portion of the lavatory 1002 (FIG. 18).

Specifically, the sitting plate 60 includes a sitting plate body 62 and a leg portion 64.

The sitting plate body 62 has an elongated shape and one end of the sitting plate body 62 in the longitudinal direction is rotatably fixed to the side wall 1208 on the opposite side to the wash basin 1602 by a hinge 63. The sitting plate body 62 includes a top surface 6202 and a back surface 6204 opposite the top surface 6202. The top surface 6202 face upward when the sitting plate body 62 is positioned to extend in the horizontal direction.

The leg portion 64 is provided being able to rotate by a support shaft 6206 provided on the back surface 6204 at the other end in the longitudinal direction of the sitting plate body 62.

As illustrated in FIG. 18, when the sitting plate 60 is not in use, the leg portion 64 is stored within a recess portion 6210 of the back surface 6204 of the sitting plate body 62. As illustrated in FIGS. 19 and 20, when the sitting plate 60 is in use, in a state of the sitting plate body 62 extending in the horizontal direction, the leg portion 64 extends down from the other end in the longitudinal direction of the sitting plate body 62 and comes in contact with the floor 1212 of the lavatory 1002 such that the sitting plate body 62 is supported in a horizontal state.

According to the second embodiment, the feet can be washed while sitting on the sitting plate 60. This is advantageous in that the same effects as that of the first embodiment can be achieved and the feet can be washed in a more comfortable position.

Note that a folding chair or the like may be provided in the lavatory 1002. However, providing a sitting plate such as the sitting plate 60 of the embodiment described above removes the need to provide a folding chair in the lavatory 1002 and is advantageous in that the space in the lavatory 1002 is not reduced.

Note that in the embodiments described above, the faucet 34 is provided at a lower portion of the rear wall 1204 to the side of the toilet 22 by the faucet storage device 40. However, the position of the faucet 34 when not in use is not limited to at a lower portion of the rear wall 1204 to the side of the toilet 22, and various positions such as at the left and right side walls 1206 and 1208 and on the floor (bottom wall) 1212 may be employed.

The faucet 34 may have a known type of structure, and the control of starting and stopping the discharge of water from the faucet 34 by the water control unit 44 may be control by a known method.

Also, in the present embodiment described above, the lavatory unit for a vehicle is an aircraft lavatory unit. However, the lavatory unit for a vehicle of the present technology has broad application to various lavatory units for a vehicle other than an aircraft such as a watercraft, bus, camping car or other automobile and a railway vehicle such as a bullet train.

The invention claimed is:

1. A lavatory unit for a vehicle comprising:
   a toilet body,
   a toilet seat provided rotatably between a use position and a non-use position, at the use position the toilet seat being placed on the toilet body and at the non-use position the toilet seat positioned standing from a back end of the toilet body, and
   a lid provided rotatably between a cover position and an open position, at the cover position the lid being placed on the toilet seat positioned in the use position and covering the toilet seat, and at the open position the lid positioned standing from the back end of the toilet body and opening the toilet seat; the lavatory unit for a vehicle comprising:
   a water drainage plate rotatable together with the lid between the cover position and the open position in a state where the water drainage plate being stored within an inner surface of the lid, and separated from the lid in the open position of the lid, being put in a placed position where the water drainage plate being placed on the toilet seat in the use position;
   a faucet provided movably within the lavatory;
   a water control unit configured to start and stop discharge of water from the faucet; and
   a faucet holding portion that holds the faucet and causes water discharged from the faucet to head to inside the toilet body with the lid in the open position, wherein
   the water drainage plate comprising:
   a placement portion that is placed on the toilet seat positioned in the use position and covers the toilet seat, and
   a drainage portion that allows a foot being placed on the drainage portion and guides water discharged from the faucet to inside the toilet body.

2. The lavatory unit for a vehicle according to claim 1, further comprising:
   an engage/disengage mechanism that detachably couples the lid and the water drainage plate.

3. The lavatory unit for a vehicle according to claim 1, wherein:
   the lid comprises an inner surface that faces the toilet body in the cover position; and
   the faucet holding portion comprises the lid and a faucet fixing device provided on the inner surface of the lid, the faucet fixing device detachably holds the faucet.

4. The lavatory unit for a vehicle according to claim 3, wherein:
   the faucet fixing device is provided rotatably between a storage position and a use position, at the storage position the faucet fixing device is overlapped on the inner surface of the lid and at the use position the faucet fixing device standing from the inner surface of the lid.

5. The lavatory unit for a vehicle according to claim 1, wherein the placement portion comprises:
   a placement portion body that is placed on the toilet seat and covers the toilet seat; and
   a raised wall that stands completely around a periphery of the placement portion body.

6. The lavatory unit for a vehicle according to claim 1, wherein the drainage portion comprises:
   an inclined surface that gets lower going inward from the placement portion; and
   a drain hole formed in the inclined surface at a position corresponding to a center of the placement portion.

7. The lavatory unit for a vehicle according to claim 1, wherein
   the drainage portion is formed as a net-like member disposed inward of the placement portion.

8. The lavatory unit for a vehicle according to claim 1, further comprising:
   a sitting plate rotatable between a use position and a storage position, at the use position the sitting plate being extended in a horizontal direction and allowing for sitting facing the toilet, and at the storage position the sitting plate overlapping against a wall portion of the lavatory.

9. The lavatory unit for a vehicle according to claim 8, wherein the sitting plate comprises:
   a sitting plate body that has an elongated shape, a first end of the sitting plate body in a longitudinal direction is fixed to a wall portion of the lavatory, rotates about the first end between the use position and the storage position, and comprises a top surface that faces up in the use position and a back surface opposite the top surface; and
   a leg portion rotatably provided on the back surface of the sitting plate body at a second end in the longitudinal direction of the sitting plate body, when the sitting plate body is in the storage position, the leg portion being stored at the back surface of the sitting plate body and, when the sitting plate body is in the use position, the leg portion extending down from the second end in the longitudinal direction, coming into contact with a floor of the lavatory, and supporting the sitting plate body in the use position.

10. The lavatory unit for a vehicle according to claim 1, wherein:
    the faucet is attached to an end of a flexible hose that supplies water, and
    a faucet storage device is provided on a wall portion of the lavatory near the toilet body, stores the hose in a manner allowing it to be pulled out, and detachably holds the faucet.

11. The lavatory unit for a vehicle according to claim 2, wherein:
    the lid comprises an inner surface that faces the toilet body in the cover position; and
    the faucet holding portion comprises the lid and a faucet fixing device provided on the inner surface of the lid, the faucet fixing device detachably holds the faucet.

12. The lavatory unit for a vehicle according to claim 11, wherein:
the faucet fixing device is provided rotatably between a storage position and a use position, at the storage position the faucet fixing device is overlapped on the inner surface of the lid and at the use position the faucet fixing device standing from the inner surface of the lid.

13. The lavatory unit for a vehicle according to claim 12, wherein the placement portion comprises:
a placement portion body that is placed on the toilet seat and covers the toilet seat; and
a raised wall that stands completely around a periphery of the placement portion body.

14. The lavatory unit for a vehicle according to claim 13, wherein the drainage portion comprises:
an inclined surface that gets lower going inward from the placement portion; and
a drain hole formed in the inclined surface at a position corresponding to a center of the placement portion.

15. The lavatory unit for a vehicle according to claim 13, wherein
the drainage portion is formed as a net-like member disposed inward of the placement portion.

16. The lavatory unit for a vehicle according to claim 15, further comprising:
a sitting plate rotatable between a use position and a storage position, at the use position the sitting plate being extended in a horizontal direction and allowing for sitting facing the toilet, and at the storage position the sitting plate overlapping against a wall portion of the lavatory.

17. The lavatory unit for a vehicle according to claim 16, wherein the sitting plate comprises:
a sitting plate body that has an elongated shape, a first end of the sitting plate body in a longitudinal direction is fixed to a wall portion of the lavatory, rotates about the first end between the use position and the storage position, and comprises a top surface that faces up in the use position and a back surface opposite the top surface; and
a leg portion rotatably provided on the back surface of the sitting plate body at a second end in the longitudinal direction of the sitting plate body, when the sitting plate body is in the storage position, the leg portion being stored at the back surface of the sitting plate body and, when the sitting plate body is in the use position, the leg portion extending down from the second end in the longitudinal direction, coming into contact with a floor of the lavatory, and supporting the sitting plate body in the use position.

18. The lavatory unit for a vehicle according to claim 17, wherein:
the faucet is attached to an end of a flexible hose that supplies water, and
a faucet storage device is provided on a wall portion of the lavatory near the toilet body, stores the hose in a manner allowing it to be pulled out, and detachably holds the faucet.

* * * * *